Patented Sept. 18, 1928.

1,685,004

UNITED STATES PATENT OFFICE.

EUGEN MISLIN, OF PRAGUE-VRSOVICE, CZECHOSLOVAKIA, ASSIGNOR TO JOSEPH FRANZ DAUBEK AND GEORG DAUBEK, OF BRNENCE, CZECHOSLOVAKIA.

METHOD FOR INCREASING THE USEFULNESS OF FODDER AND FOOD.

No Drawing. Application filed April 7, 1925. Serial No. 21,421.

The usefulness of many products and the nutritive value of the substance contained in them for persons and animals is considerably lessened by reason of the husks about the cells, which themselves contain valuable products and which resist the action of the gastric juices. Other products, especially waste products, frequently contain substances having a disagreeable smell, which considerably reduces their value. Also, most raw products are lacking in the physiologically valuable constituents from the point of view of fodder or food.

Even the intestinal canals of ruminant animals cannot perfectly assimilate the substances mentioned above. It is therefore necessary to transform the undesirable substances by decomposition, so that the proteins in them are put in better condition for assimilation.

The present invention relates to a method whereby foodstuffs are made useful and assimilative to a high degree so that the proteins which particularly are not responsive to the action of the gastric juices, are converted into a form suitable for assimilation with a corresponding increase in the nutritive value of the products. As these products contain enzymes, these artificially produced products can of course be be used for other purposes.

Also, in the case of waste products of slaughter houses and from carcasses and the residues of fish preserving factories it is possible to remove substances having an unpleasant smell.

Further, the lipases which are found in oleaginous fruits or in their residues, for example pressed olives (Orujos and the like) which contain an enzyme with a very unpleasant smell that greatly detracts from the value of such product can by means of the present invention be converted into an inactive form with the result that the original products are of extreme stability so that they are harmed neither by a sea voyage nor by remaining long in storage.

In carrying out the present invention yeasts are employed which are cultivated solely on pentosans without the use of sugar (hexose).

Owing to the action of micro-organisms obtained from tropical cereals it is possible to prepare, without the addition of sugar (hexose) a medium for yeast cultivated on pentosans, so that a large growth of yeast is produced on the pentosans without the production of any substances such as alcohol, carbonic acid gas or the like, which might hinder the growth of the yeast.

The process is carried out without any loss of the substance employed, that is without combustion and without the production of any poisonous substances.

The present invention comprises a biological manufacturing process in which the pentosans serve as nutrient media for the yeast as well as for the bacteria.

Owing to their solubility the pentosans required can be readily obtained from the raw material employed and subsequently reintroduced into the original products, so that the whole process is carried out without any loss of material, which is a most important factor.

The kinds of yeasts which are employed are those which yield an abundant growth on pentosans at a higher temperature without the addition of hexose, thus such kinds of yeast, which are not cultivated on hexoses. These kinds of yeast are found on plants growing in the open, such as for example of the Egyptian cotton capsule and so forth, and subsequently are grown on pentosans in the presence of certain bacteria as hereinafter mentioned at a temperature of 38 to 40 degrees Celsius. The torula-yeasts may be employed, if they are able to endure the symbiosis of the bacteria.

In order to promote a stronger growth of such yeast upon pentosans, certain bacteria are employed which exist in symbiosis with the above named microorganisms. A bacterium which is found in certain tropical plants such as the husks of Burma rice has been found suitable. These bacteria form very fine delicate rods, which are connected togther in chaplet form and can be readily cultivated in pentosan solutions.

These bacteria are prepared as follows: The rice grains are rinsed in water and the rinsings are allowed to act upon a sterilized pentosan solution at a temperature of 38–40° C. From these cultures all bacteria, which show fine delicate rods in chaplet form, can be isolated according to a known bacteriological process. The separate isolations are reared in separate flasks in the presence of yeasts which grow luxuriantly on pentosans. It is now found that this one kind of bacteria in chaplet form favourably influences the growth of the yeast, as opposed to all other bacteria, which also form delicate rods, but which retard the growth and consume the yeast. One mode of carrying out the method according to the present invention consists in that the broken up and pre-prepared initial material is impregnated with the described virulent micro-organism in very saturated emulsions. The entire quantity of micro-organism cultures employed thereby, fluctuates according to the composition of the initial material and has to be determined for every material in accordance with the capacity of imbibition of the initial product. A general rule is, that the bacilli-cultures should impregnate all parts of the material without any excess.

In order to be in a position to cause not only by means of the action of the micro-organism alone, the working up or transformation of the raw material but also to simultaneously enrich the material with physiologic uncultivation products or enzymes, it is necessary to gradually heat up on suitable vibrating or agitation devices either the micro-organism emulsions or the pentosan emulsions, so that according to the present invention the same is forced to give up enzymes or separated products, or the raw materials already imbibed are gradually heated up on suitable stirring devices. In both methods or procedures the temperature has to be increased gradually to between 40 and 50 degrees Celsius.

Thus in consequence of the agitating process or of the stirring process, as well as also by gradually increasing the temperature, the micro-organisms form physiologically valuable split-off products, which effect not only the working up of the indigestible substances, the removal of the badly smelling ingredients and the lipatic ingredients, but enrich the initial products very considerably with the valuable enzymes, vitamines, nucleins and the like and at the same time produce extremely beneficial products for the nourishment or rearing of animal, which exert an extremely favourable influence on the formation or incarnation of flesh, fat and milk. According to the nature of the initial products this process is completed in about 6 to 8 hours, provided the material is frequently agitated or shaken.

The finished product is dried, preferably in suitable devices, and stored away.

In this way a biologically advantageous product is obtained, which is extremely rich in valuable substances and can be stored away for an unlimited number of years in consequence of the split up or separated products of the micro-organism contained in the same.

By means of the method according to the present invention all raw, intermediate and waste products, for instance cereals such as maize, barley and the like, the waste products of flour mills, husking or peeling mills and oil mills, further the waste products of animal origin, such as cadavers, carcasses, the waste products of slaughter-houses and so forth can be worked up into useful materials.

I claim:—

1. A method for increasing the nutrient value of fodder and foodstuffs consisting in cultivating yeasts in common with bacteria on pentosans without the addition of hexoses, and allowing the resulting mass to act on the fodder and foodstuffs.

2. A method for increasing the nutrient value of fodder and foodstuffs consisting in cultivating various species of yeasts in common with bacteria on pentosans without the addition of hexoses, and allowing the micro-organism cultures thus produced to act on the fodder and foodstuffs.

3. A method for increasing the nutrient value of fodder and foodstuffs consisting in simultaneously cultivating various species of yeasts in common with bacteria on pentosans without the addition of hexoses, allowing the resulting mass to act on the fodder and foodstuffs, and gradually heating the said mass and fodder and foodstuffs to about 50 degrees Celsius.

In testimony whereof I affix my signature.

EUGEN MISLIN.